United States Patent
Sivaraman et al.

(10) Patent No.: US 7,678,725 B2
(45) Date of Patent: Mar. 16, 2010

(54) TRANSLUCENT POLYCRYSTALLINE ALUMINA CERAMIC

(75) Inventors: Karthik Sivaraman, Mayfield Village, OH (US); Shuyi Qin, Shanghai (CN); Ming Gao, Shanghai (CN)

(73) Assignee: General Electric Company, Schenectady, NY (US)

( * ) Notice: Subject to any disclaimer, the term of this patent is extended or adjusted under 35 U.S.C. 154(b) by 410 days.

(21) Appl. No.: 11/803,290

(22) Filed: May 14, 2007

(65) Prior Publication Data

US 2008/0284338 A1    Nov. 20, 2008

(51) Int. Cl.
C04B 35/115    (2006.01)
H01J 61/30    (2006.01)

(52) U.S. Cl. ...................... 501/153; 313/636
(58) Field of Classification Search ................ 501/153; 313/636
See application file for complete search history.

(56) References Cited

U.S. PATENT DOCUMENTS

| | | |
|---|---|---|
| 3,026,210 A | 3/1962 | Coble |
| 3,588,573 A | 6/1971 | Chen et al. |
| 3,792,142 A | 2/1974 | Kobayashi et al. |
| 3,905,845 A | 9/1975 | Kobayashi et al. |
| 4,150,317 A | 4/1979 | Laska et al. |
| 4,222,978 A | 9/1980 | Oda et al. |
| 4,285,732 A | 8/1981 | Charles et al. |
| 4,373,030 A | 2/1983 | Kaneno et al. |
| 4,495,116 A | 1/1985 | Kaneno et al. |
| 4,699,774 A | 10/1987 | Prud'Homme Van Reine et al. |
| 4,762,655 A | 8/1988 | Rhodes et al. |
| 4,797,238 A | 1/1989 | Rhodes et al. |
| 4,948,538 A | 8/1990 | Wei et al. |
| 5,376,606 A | 12/1994 | Kim et al. |
| 5,382,556 A | 1/1995 | Takahashi et al. |
| 5,424,609 A | 6/1995 | Geven et al. |
| 5,587,346 A | 12/1996 | Zuk |
| 5,625,256 A | 4/1997 | Tiedt et al. |
| 5,627,116 A | 5/1997 | Zuk |
| 5,631,201 A | 5/1997 | Wei et al. |
| 5,682,082 A | 10/1997 | Wei et al. |
| 5,698,948 A | 12/1997 | Caruso |
| 5,725,827 A | 3/1998 | Rhodes et al. |
| 5,747,402 A | 5/1998 | Wei et al. |
| 5,751,111 A | 5/1998 | Stoffels et al. |

(Continued)

FOREIGN PATENT DOCUMENTS

EP    0 218 279    9/1986

(Continued)

OTHER PUBLICATIONS

G.C.Wei, A.Hecker, D.A.Goodman, Translucent Polycrystalline Alumina with Improved Resistance to Sodium Attack, *J.Am.Ceram., Soc.*, 84[12]23853-62, Abstract, 2001.

(Continued)

*Primary Examiner*—Karl E Group
(74) *Attorney, Agent, or Firm*—Fay Sharpe LLP

(57) ABSTRACT

A polycrystalline body includes aluminum oxide, magnesium oxide, zirconium oxide, and lutetium oxide. The lutetium oxide is present in an amount of at least 10 ppm of the weight of the ceramic body, and the magnesium and zirconium oxides are present at a molar ratio of from 0.5:1 to 3:1.

21 Claims, 4 Drawing Sheets

U.S. PATENT DOCUMENTS

| | | |
|---|---|---|
| 6,200,918 B1 | 3/2001 | Yanagitani et al. |
| 6,639,362 B1 | 10/2003 | Scott et al. |
| 6,741,033 B2 | 5/2004 | Scott et al. |
| 7,063,586 B2 | 6/2006 | Scott et al. |
| 2003/0165790 A1 | 9/2003 | Castro et al. |
| 2006/0100088 A1 | 5/2006 | Loureiro et al. |
| 2006/0164016 A1 | 7/2006 | Rintamaki et al. |

FOREIGN PATENT DOCUMENTS

| | | | |
|---|---|---|---|
| JP | 2002012471 A | | 1/2002 |
| WO | WO 2003/059839 | | 12/2002 |
| WO | WO 2003/057065 | A1 | 7/2003 |
| WO | WO 2004/007397 | | 1/2004 |
| WO | WO 2004/007398 | | 1/2004 |

OTHER PUBLICATIONS

K. Maekawa, NGK Insulators, Ltd., Recent Progress in Ceramic Materials for Lamp Application, *Electronic Components Division*, pp. 293-303, Dec. 27, 2004.

TRANSLUCENT POLYCRYSTALLINE ALUMINA CERAMIC

BACKGROUND OF THE INVENTION

The present invention relates generally to polycrystalline alumina ceramics. It finds particular application in connection with an alumina ceramic composition which is doped with zirconia, magnesia, and lutetia, which is suited to formation of a discharge vessel for a lamp and will be described with particular reference thereto.

Discharge tubes for high intensity discharge (HID) lamps, and in particular, high pressure sodium (HPS) lamps have been fabricated from a variety of translucent alumina materials, including polycrystalline alumina and single crystalline alumina (sapphire). The discharge tube includes a fill of light-emitting elements, such as sodium and mercury, and a starting gas, such as argon. When the lamp is energized, an arc discharge forms with a characteristic emission spectrum which is related to the particular composition of the fill.

The life of such sodium lamps is frequently limited by the loss of the sodium portion of the fill during lamp operation by diffusion of sodium ions through the wall of the discharge tube. The lost sodium is then unavailable to the arc discharge and can no longer contribute its characteristic emissions, causing the light output to gradually diminish, and causing the color to shift from white towards blue. In addition, the arc becomes more constricted, and in a horizontally operated lamp, the arc may bow against and soften the arc chamber wall. Sodium loss may also cause the operating voltage of the lamp to increase to the point where the arc can no longer be sustained by the ballast and failure of the lamp may result.

Ceramics doped with magnesium oxide and used in lamps have been shown to be susceptible to darkening the outer jacket when lamps are operated at wattages above the design space of the ceramic arc tube. Darkening of the glass outer jacket has been linked to a combination of evaporation of the ceramic arc chamber and sodium loss through the walls of the arc tube due to reaction and diffusion mechanisms. This can limit lumen output and the useful life of the lamp. In addition to the sodium diffusion, the sodium in the arc can react with the alumina at the grain boundaries to form sodium aluminate, which adversely affects the structural integrity of the tube and shortens lamp life. Discharge lamps are being designed for ever increasing internal sodium partial pressure within the alumina arc tube to improve the color rendition and provide a whiter emitted light. However, higher internal sodium pressure further shortens lamp life due to increased rate of sodium loss from the arc chamber. Progressive sodium loss results in a corresponding continual rise in the lamp operating voltage, a decrease of both correlated color temperature and color rendering index, and a color shift from white to pink. Also, the sodium which migrates through the arc chamber wall deposits on the inside wall of the evacuated outer lamp envelope causing a brownish stain on the envelope which, in turn, further reduces the light output of the lamp.

The manufacture of polycrystalline alumina (PCA) and single crystal alumina (sapphire) HPS arc discharge lamps is known. U.S. Pat. Nos. 3,026,210; 4,150,317 and 4,285,732 to Coble, Alaska et al., and Charles et al., respectively, disclose the production of a high density alumina body having improved visible light transmission using relatively pure alumina powder and small amounts of magnesia.

It is desirable for lamps to have a high efficiency to reduce power consumption. A need exists for an alumina arc tube having a reduced tendency to permit sodium diffusion which also provides high transmission of light.

BRIEF DESCRIPTION OF THE INVENTION

In one aspect of the exemplary embodiment, a polycrystalline body includes aluminum oxide, magnesium oxide, zirconium oxide, and lutetium oxide. The lutetium oxide is present in an amount of at least 10 ppm of the weight of the ceramic body, and the magnesium and zirconium oxides are present at a molar ratio of from 0.5:1 to 3:1

In another aspect, a method of forming a polycrystalline alumina body includes forming a mixture of ceramic-forming ingredients and an organic binder. The ceramic-forming ingredients include particulate alumina and additives. The additives are expressed in terms of their oxides in parts per million of a weight of the total ceramic forming ingredients as follows: magnesium oxide at least 150 ppm, zirconium oxide at least 100 ppm, and lutetium oxide at least 10 ppm. The method includes forming a shaped body from the mixture and firing the shaped body to form a polycrystalline alumina body.

In another aspect, a polycrystalline body includes aluminum oxide, magnesium oxide, and lutetium oxide, the oxides being present in the following amounts, expressed in parts per million of the weight of the ceramic body as follows: 100-200 ppm magnesium oxide, 100-450 ppm zirconium oxide, and 10 ppm-100 ppm lutetium oxide.

DETAILED DESCRIPTION OF THE INVENTION

Aspects of the exemplary embodiments relate to a ceramic material which includes oxides of zirconium, magnesium, and lutetium, to a ceramic body, such as a discharge vessel, formed of the ceramic material, and to a lamp which includes the ceramic body.

All percentages and parts per million (ppm) referred to herein are expressed by weight, except as otherwise noted.

Figure 1:
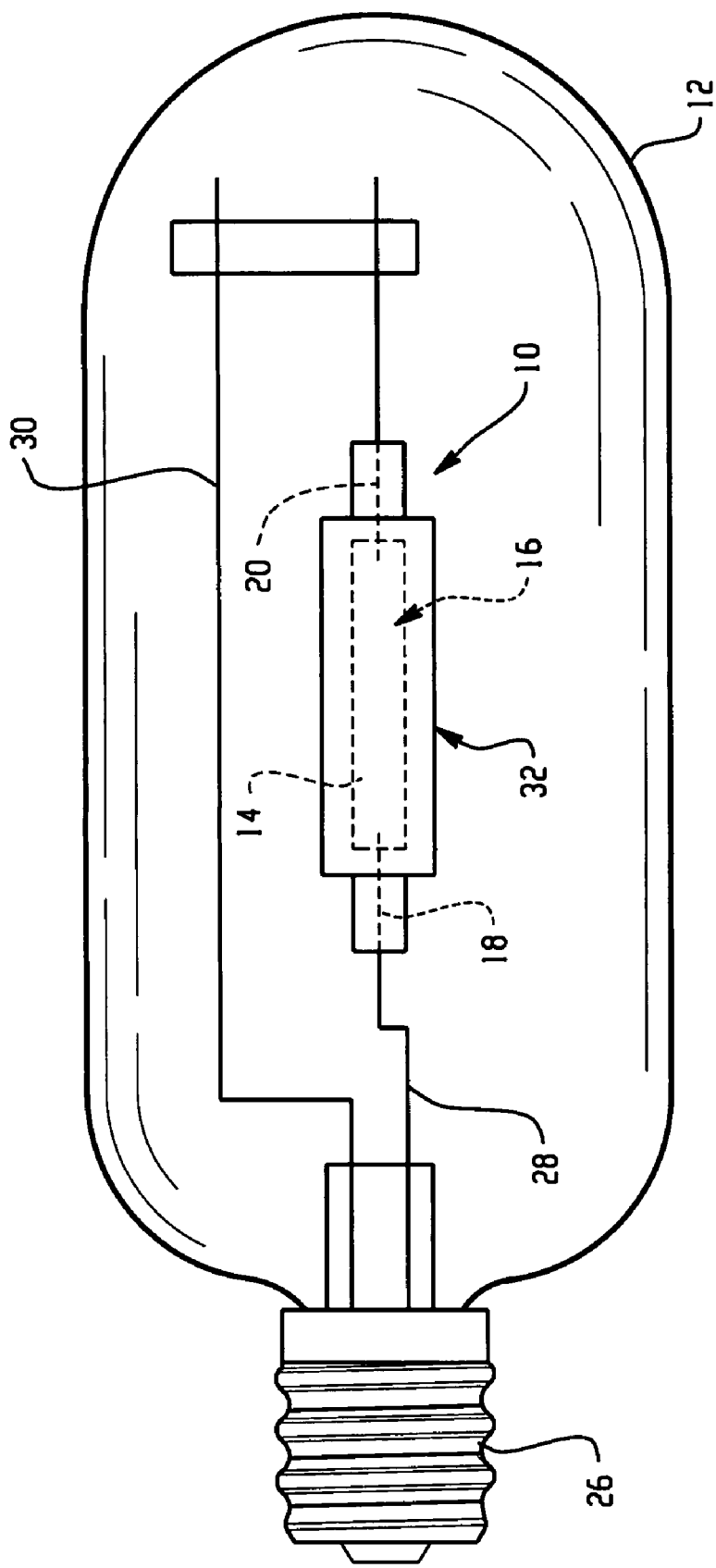
FIG. 1 is a side sectional view of a lamp in accordance with one aspect of the invention.

With reference to FIG. 1, an exemplary high pressure sodium lamp is shown. The lamp includes a ceramic discharge vessel in the form of a tube 10, which may be disposed within a transparent outer vitreous envelope 12. Discharge tube 10 defines a chamber 14 which contains a fill 16 under pressure that is capable of sustaining an arc discharge when energized.

Figure 2:
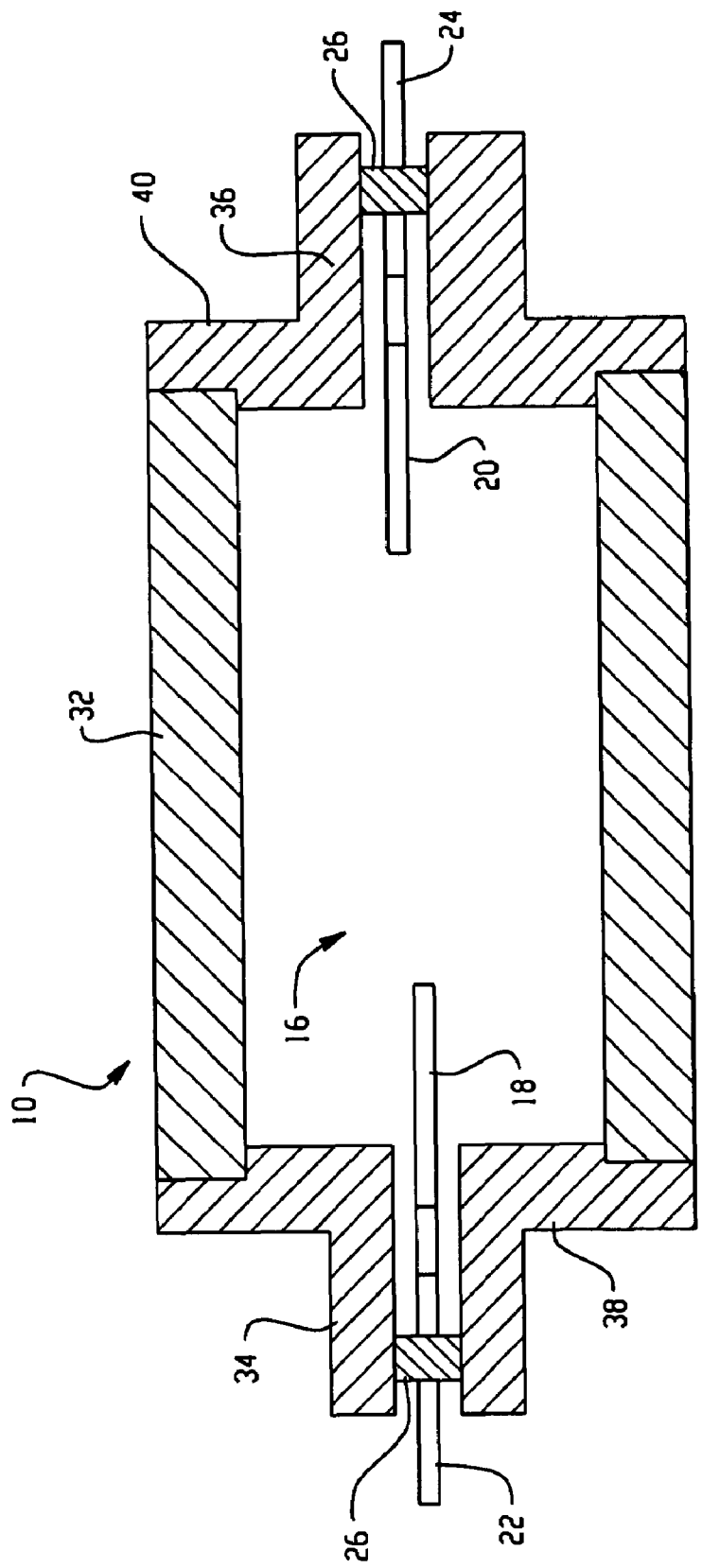
FIG. 2 is a size sectional view of the discharge tube of FIG. 1.

As illustrated in FIG. 2, electrodes 18, 20, formed from tungsten or other suitable electron emissive material, are at least partially disposed within the discharge chamber 14. Electrical lead wires 22, 24, which may be formed from molybdenum or niobium, allow coupling of electrical energy to the tungsten electrodes 18, 20 to enable excitation of the fill 16. Sealing frit 26 bonds the lead wires 22, 24 to the alumina of the arc chamber 14 at either end. Lead wires 22, 24 are electrically connected to a threaded screw base 26 of the lamp by support members 28 and 30 (FIG. 1).

The discharge vessel 10 may include a cylindrical body portion 32 with leg portions in the form of tubes 34, 36 extending axially from end caps 38, 40 of the body portion. Other configurations of the body portion are also contemplated, such as a generally spherical or oblate shape. The body portion 32, tubes 34, 36 and end caps 38, 40 of the exemplary embodiment may all be formed from a polycrystalline aluminum oxide (alumina, $Al_2O_3$) ceramic which includes magnesium (Mg), zirconium (Zr), and lutetium (Lu). These elements may be present primarily in the form of their oxides: magnesia (MgO), zirconia ($ZrO_2$), and lutetia ($Lu_2O_3$). While the exemplary ceramic composition is described in terms of a discharge vessel, it is to be appreciated that the exemplary ceramic may find other applications.

An exemplary fill 16 for a high pressure sodium lamp includes sodium, mercury, and a starting gas. Exemplary starting gases are inert gases, such as argon, xenon, krypton, and combinations thereof. The inert gas (or gases) in the fill may have a cold fill pressure from about 10 to about 500 torr, e.g., about 200 torr, which increases during lamp operation. The partial pressure of the sodium may range from about 30 to about 1000 torr during operation, e.g., about 70 to 150 torr for high efficacy. For a ceramic metal halide lamp, the fill may include a mixture of mercury, an inert gas such as argon, xenon, krypton, and a metal halide. Exemplary metal halides are halides (e.g., bromides, iodides) of rare earth elements, such as scandium, indium, dysprosium, neodymium, praseodymium, cerium, thorium, and combinations thereof. However, other fill compositions may be used with the exemplary discharge vessel. The arc discharge between electrodes 18, 20 may be initiated by a starting voltage in the form of a pulse. Arc discharge is then sustained by the ionized vapor and the operating voltage.

As is known in the art, the discharge vessel 10 may be formed by sintering together green ceramic components, optionally followed by further processing of the sintered vessel to increase transmittance, as described for example, in U.S. Pat. Nos. 6,639,362 6,741,033, and 7,063,586. U.S. Pat. Nos. 5,424,609, 5,698,948, and 5,751,111 disclose alternative discharge vessels which may be used.

In particular, the green ceramic components are fabricated by die pressing, extruding or injection molding a mixture of a ceramic powder and a liquid binder composition. The thus-formed components are pre-sintered to about 900-1200° C. in air to remove the organic processing aids. The pre-sintered components are then partially sintered at a temperature of around 1500-1900° C. in a hydrogen atmosphere to form gas-tight joints. During this sintering, the components shrink to different extents. The differential shrinkage is used advantageously in forming the gas-tight joints. The sintered discharge tube may be subjected to further processing to increase transmittance. For example, a densifying and/or porosity reducing step, such as hot isostatic pressing of the arc tube may be followed by chemically polishing the surface of the discharge tube. Polishing may be performed with a molten inorganic flux that dissolves alumina at a moderate rate until a surface layer has been dissolved to provide a relatively smooth appearance. Useful fluxing agents for providing a relatively smooth and flat surface include alkali metal borates, such as sodium and potassium borates, alone or in combination, and optionally an alkali metal chloride, such as NaCl or KCl.

The green ceramic components used to form the discharge tube may be formed from a particulate mixture which is predominantly particulate aluminum oxide (generally alumina, $Al_2O_3$). A small amount of magnesium oxide (magnesia, MgO) is mixed with the alumina. The alumina particles may be at least 99.9% alumina, e.g., about 99.98% pure alumina and have a surface area of about 1.5 to about 10 $m^2/g$, typically about 8 $m^2/g$. The ceramic powder may be doped with magnesia to inhibit grain growth, for example in an amount equal to 0.03% to 0.2%, e.g., about 0.05% by weight of the alumina. The particulate mixture may have an average particle size of less than 1 micrometer ($\mu$). In some embodiments, the average particle size is at least $0.2\mu$.

To incorporate zirconia and lutetia, the particulate mixture may be doped with an aqueous solution which includes soluble salts of zirconium and lutetium, such as nitrates or oxychlorides, e.g., zirconium nitrate and lutetium nitrate. These salts are converted to their oxides during the sintering stage. Alternatively, these dopants may be added as finely dispersed powder.

The resulting mixture of ceramic forming ingredients is combined with a liquid binder composition which includes an organic binder, a solvent, such as water, and optionally a lubricant. Organic binders which may be used individually or in combination include organic polymers, such as polyols, polyvinyl alcohol, vinyl acetates, acrylates, cellulosics, such as methyl cellulose or cellulose ethers, polyesters and stearates. An exemplary binder is a water soluble cellulose ether having a weight average molecular weight of about 200,000-500,000, e.g., about 370,000. This may be combined with deionized water as a solvent and oleic acid as a lubricant. For example, a suitable extrusion formulation may include 4-5 wt % cellulose ether, 2-3 wt % oleic acid, 16-17 wt % water, and the balance, alumina ceramic powder and other ceramic forming ingredients.

In other embodiments, the binder composition may comprise a wax, such as paraffin wax, having a melting point of about 73-80° C. Other suitable binder components may include beeswax, aluminum stearate, and stearic acid.

The green ceramic may be formed by injection molding or an extrusion process, e.g., screw extrusion. In the case of injection molding, the mixture of ceramic material and binder composition is heated to form a highly viscous mixture. The mixture is then injected into a suitably shaped mold and then subsequently cooled to form a molded part. Subsequent to injection molding, the binder is removed from the molded part, typically by thermal treatment, to form a de-bindered part. The thermal treatment may be conducted by heating the molded part in air or a controlled environment, e.g., a vacuum, nitrogen, rare gas, to a maximum temperature (e.g., about 900-1000° C.), and then holding the maximum temperature.

Figure 3:
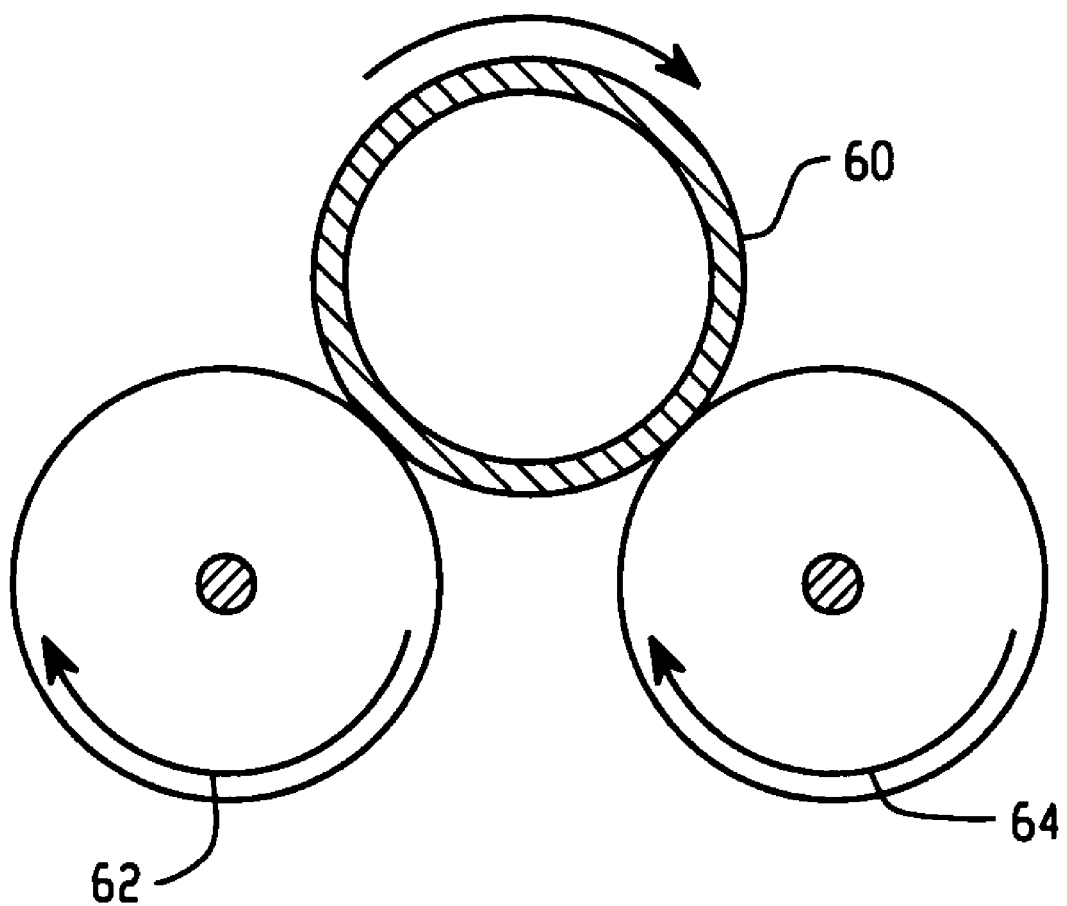
FIG. 3 illustrates an exemplary apparatus for drying a shaped body in accordance with one aspect of the exemplary embodiment.

In the case of an extrusion process, the powdered ceramic material (alumina and MgO) may be mixed with cellulose ether, oleic acid and nitrates/oxychlorides of zirconium and lutetium dissolved in water. This mixture is then kneaded as dough and extruded by a screw extruder as a green tube body 60. The green tube body may then be dried on automatically rotated rods 62, 64 in 55~60° C. heated air for at least half hour (FIG. 3). The rods are aligned in parallel, spaced slightly apart by a distance which is less than the width of the body, such that the green body is supported on both rods.

After drying, the extruded or molded parts may be de-bindered at about 600° C. to remove organics completely and then pre-sintered at 1050° C. in air, to provide the green ceramic with sufficient strength. The components of the discharge tube may then be adhesively tacked together in the desired configuration for forming the ceramic body during sintering. The sintering step may be carried out by heating the parts in hydrogen having a dew point of about 10 to 15° C. The temperature is progressively raised to a maximum temperature of about 1800-1900° C. and held at this temperature for at least about 2 hours. Finally, the temperature is brought back to room temperature. The resulting ceramic material comprises densely sintered polycrystalline aluminum.

In general, the average grain size of the alumina particles in the sintered ceramic body is at least about 10μ and can be up to about 60μ, e.g., at least 20μ, and in some embodiments between about 25μ and about 45μ, to provide the discharge vessel with translucent properties while maintaining the strength properties of the ceramic. In one embodiment, at least 99.9% of the grains are less than 75μ in diameter.

The ceramic forming ingredients are ingredients which are inorganic oxides or which are converted thereto during forming the parts or sintering. These are primarily alumina, magnesia, zirconium compounds, and lutetium compounds in the illustrated embodiment. These ingredients may be present in the pre-sintered composition in the following amounts (in parts per million ppm, expressed as the oxide, based on the total weight of all oxides of the ceramic forming ingredients present).

Magnesia: 150-1000 ppm, e.g., at least 200 ppm, e.g., up to about 500 ppm, such as up to 450 ppm.

Zirconia: 100-600 ppm, e.g., 250-500 ppm

Lutetia: 10-100 ppm, such as at least 20 ppm or at least 25 ppm. Lutetia may be present at up to about 90 ppm, e.g., up to about 70 ppm, such as up to about 50 ppm or up to about 45 ppm.

Alumina may make up the balance of the ceramic forming ingredients. In one embodiment all other ceramic forming ingredients (i.e., other than alumina, magnesia, lutetia, and zirconia, or their precursors), are present in the pre-sintered composition so as to provide a sintered body having a total of less than 800 ppm, and in some embodiments, no more than about 500 ppm of these other ceramic forming ingredients.

The concentrations of alumina, magnesia, lutetia, and zirconia in the finished ceramic body, expressed as ppm of the total oxides, is generally about the same as that prior to sintering. However, in the case of magnesia, a portion of the magnesia may be lost during processing, e.g., by vaporization.

The finished, sintered ceramic body may thus include the following oxides, based on the total weight of the ceramic body.

Magnesia: at least 100 ppm, e.g., at least about 140 ppm or at least about 180 ppm. Magnesia may be present at up to 400 ppm, for example, up to about 300 ppm, such as up to about 250 ppm. In some embodiments, magnesia is 100-200 ppm.

Zirconia: at least 100 ppm, e.g., at least 350 ppm. Zirconia can be present at up to 840 ppm, e.g., up to 630 ppm.

Lutetia: at least 10 ppm, such as at least 25 ppm or at least 30 ppm. Lutetia may be present at up to about 120 ppm. In some embodiments, it is present at up to about 100 ppm, e.g., up to about 80 ppm, such as up to about 60 ppm or up to about 50 ppm.

Expressed as molar ratios, the molar ratio of Mg:Zr in the sintered body may be from about 0.5:1 to about 3:1, and in one embodiment, from 1:1 to 2:1. In one embodiment, the ratio is about 1.2:1.

These oxides are substantially uniformly distributed though the body. The fired ceramic body may be substantially free of oxides of alkali metals and alkaline earth metals, such as oxides of sodium, potassium, and calcium. For example these oxides may be present at a total concentration of less than 20 ppm.

The fired ceramic body is predominantly polycrystalline alumina with a hexagonal close-packed structure. For example, at least 95% or at least 99% is alumina. The body is translucent rather than transparent, i.e., the amount of diffuse light exceeds the in-line light which is transmitted through the body. For example, about 20% or less of the light is emitted in-line, as compared with about 80% for a transparent body. The magnesia imparts transparency to the finished tube and helps to reduce sodium loss during lamp operation. Zirconia is believed to control grain growth. While the mechanism is not fully understood, the lutetia present may function to scavenge magnesia, resulting in excess magnesia being liberated from the ceramic body during firing, such that an appropriate amount for control of sodium loss remains.

The high transmittance ceramic arc tubes produced in this manner show improved optical transmission over conventional polycrystalline alumina arc tubes. Ceramic HPS lamps fabricated with the high transmittance ceramic discharge tubes have transmittances which are superior to those of conventional, polycrystalline alumina lamps. In particular, the presence of lutetia in the polycrystalline alumina ceramic body, in combination with zirconia and magnesia, provides the body with a high transmission of light from a standard source, as measured over all wavelengths in the visible range of the spectrum. In general, the total transmission of a tubular ceramic body formed from the exemplary ceramic composition may be about 98% or higher, as compared to about 96.5% for a tube formed of a conventional alumina doped with magnesia only. The exemplary ceramic body may have a transmission which is at least about 0.1% higher than for a comparable ceramic body formed without lutetium oxide. This increase in transmission has significant benefits in the overall efficiency (lumens/watt) of the lamps formed with the exemplary ceramic body.

Without intending to limit the scope of the invention, the following examples demonstrate exemplary compositions.

EXAMPLES

Ultra high purity alumina powder (99.98% alumina) containing 0.042 wt. % magnesia, obtained from Baikowski was doped with an aqueous solution containing oxychlorides of zirconium and lutetium. Control samples were similarly formed a) without the lutetium and b) without lutetium and zirconium. The doped mixtures were combined with a binder containing cellulose ether and oleic acid and extruded to form green ceramic tubes using a screw extruder. The discharge tubes were sintered at 1840° C. in a wet hydrogen atmosphere. The tubes had a wall thickness of about 0.75 mm.

Figure 4:
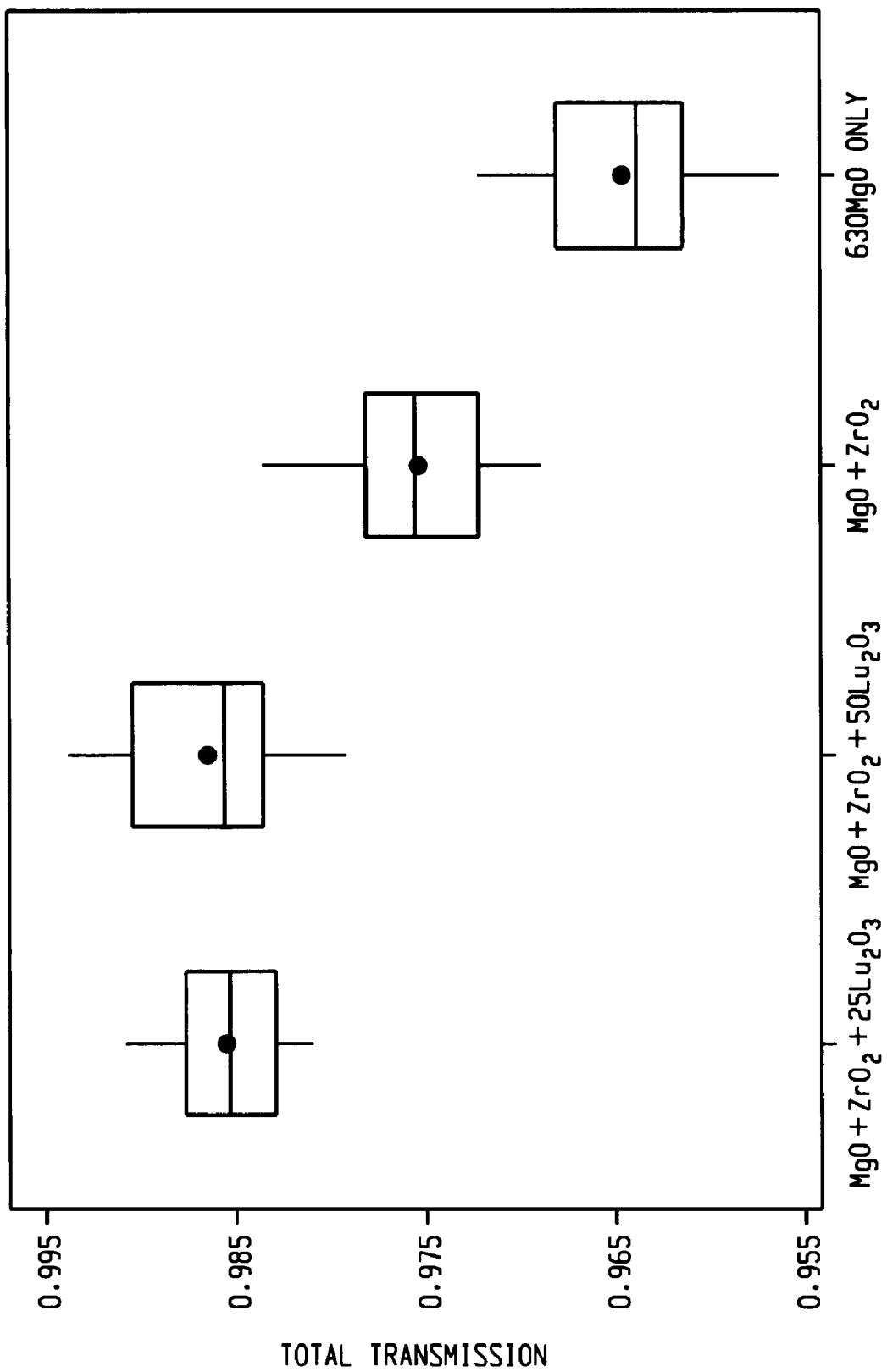
FIG. 4 is a plot illustrating transmission results for translucent polycrystalline bodies formed with and without lutetium and zirconium.

The compositions of the ceramic forming ingredients in the initial mixture were as follows (the balance in each case being the ultra high purity alumina):

A: MgO 420 ppm, $ZrO_2$ 400 ppm, $Lu_2O_3$ 25 ppm
B: MgO 420 ppm, $ZrO_2$ 400 ppm, $Lu_2O_3$ 50 ppm
C: MgO 420 ppm, $ZrO_2$ 400 ppm
D: MgO 630 ppm FIG. 4 illustrates the transmission results (a value of 1 being accorded to the light source alone) which were obtained for tubes of each of the four types: A-D. The results are shown in the form of a box plot, as measured with a light source in an integrating sphere spectrophotometer. The boxes indicate the range of variation around the mean for ten sample tubes. As can be seen from FIG. 4, the total transmission for the two compositions A and B, with lutetium oxide, was significantly higher than for compositions C and D, without lutetium oxide. The 50 ppm lutetium oxide samples B were not appreciably more light transmissive than the samples A with 25 ppm lutetium oxide, suggesting that higher amounts may not yield further increases in transmission, particularly where the transmission level is already very high.

The fired tubes had average (mean) grain sizes of the alumina grains in the range of about 30-37 microns. Grain size was measured by a linear intercept method on the pictures taken with optical microscopy. The samples with Mg/Zr/Lu both had average grain sizes which were similar to that for the Mg/Zr and slightly higher than for the Mg alone.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A polycrystalline body for a high pressure sodium lamp comprising aluminum oxide, magnesium oxide, zirconium oxide, and lutetium oxide and wherein the lutetium oxide is present in an amount of at least 10 ppm of the weight of the ceramic body, the magnesium and zirconium oxides are present at a molar ratio of from 0.5:1 to 3:1; and
    wherein the total transmission of light by the polycrystalline body is at least 98%.

2. The polycrystalline body of claim 1, wherein the oxides are present, expressed in parts per million of the weight of the ceramic body as follows:

| | |
|---|---|
| magnesium oxide | at least 100 ppm; |
| zirconium oxide | at least 100 ppm; and |
| lutetium oxide | at least 10 ppm. |

3. The polycrystalline body of claim 1, wherein the molar ratio of magnesium oxide to zirconium oxide is between 1:1 and 2:1.

4. The polycrystalline body of claim 1, wherein a molar ratio of magnesium oxide to lutetium oxide is at least 5:1.

5. The polycrystalline body of claim 1, wherein magnesium oxide is present at up to 250 ppm.

6. The polycrystalline body of claim 1, wherein zirconium oxide is present at up to 630 ppm.

7. The polycrystalline body of claim 1, wherein lutetium oxide is present at up to 120 ppm.

8. The polycrystalline body of claim 1, wherein the ceramic body is substantially free of oxides of alkali metals and alkaline earth metals.

9. The polycrystalline body of claim 1, wherein the body is translucent.

10. A lamp comprising a discharge tube which includes the ceramic body of claim 1, the discharge tube defining a sealed chamber in which a fill comprising sodium and optionally mercury is disposed.

11. The lamp of claim 10, wherein the fill further includes a starting gas.

12. The lamp of claim 10, further including electrodes extending into the chamber.

13. A method of forming the polycrystalline body of claim 1 comprising:
    forming a mixture of ceramic-forming ingredients and an organic binder, the ceramic-forming ingredients including particulate alumina and additives, the additives being expressed in terms of their oxides in parts per million of a weight of the total ceramic forming ingredients as follows:

| | |
|---|---|
| magnesium oxide | at least 150 ppm; |
| zirconium oxide | at least 100 ppm; and |
| lutetium oxide | at least 10 ppm; | forming a shaped body from the mixture;
    firing the shaped body to form a polycrystalline alumina body.

14. The method of claim 13, wherein the magnesium oxide is at least 200 ppm.

15. The method of claim 13, wherein zirconium oxide is at least 250 ppm.

16. The method of claim 13, wherein lutetium oxide is at least 20 ppm.

17. The method of claim 13, wherein the mixture is substantially free of alkali metals and alkaline earth metals and compounds thereof.

18. The method of claim 13 wherein the additives include salts of zirconium and lutetium.

19. A method of forming a discharge tube comprising:
    forming a ceramic body according to the method of claim 13, and
    sealing a fill in a chamber of the ceramic body, the fill including sodium and optionally at least one of mercury and a starting gas.

20. The method of claim 19, further including positioning electrodes so as to extend into the chamber.

21. A polycrystalline body for a high pressure sodium lamp comprising aluminum oxide, magnesium oxide, and lutetium oxide, the oxides being present in the following amounts, expressed in parts per million of the weight of the ceramic body as follows:
    100-250 ppm magnesium oxide,
    100-630 ppm zirconium oxide,
    10 ppm-120 ppm lutetium oxide, and
    wherein the total transmission of light by the polycrystalline body is at least 98%.

* * * * *